(12) United States Patent
Hayashi

(10) Patent No.: US 6,768,956 B2
(45) Date of Patent: Jul. 27, 2004

(54) HIGH PRECISION POSITION DETECTING APPARATUS CAPABLE OF REMOVING ERROR CONTAINED IN SIGNAL

(75) Inventor: Yasukazu Hayashi, Niwa-gun (JP)

(73) Assignee: Okuma Corporation, Nagoya (JP)

( * ) Notice: Subject to any disclaimer, the term of this patent is extended or adjusted under 35 U.S.C. 154(b) by 0 days.

(21) Appl. No.: 10/176,546

(22) Filed: Jun. 24, 2002

(65) Prior Publication Data

US 2003/0001564 A1 Jan. 2, 2003

(30) Foreign Application Priority Data

Jun. 29, 2001 (JP) ........................................ 2001-199168

(51) Int. Cl.[7] ................................................ G01B 7/30
(52) U.S. Cl. ....................................................... 702/91
(58) Field of Search .......................... 702/91; 348/207; 315/209; 324/760, 207; 322/15; 290/40, 208; 361/87, 160; 707/35; 178/18

(56) References Cited

U.S. PATENT DOCUMENTS 4,434,401 A * 2/1984 York .......................... 324/766
2001/0043450 A1 * 11/2001 Seale et al. ................. 361/160
2002/0163464 A1 * 11/2002 Winter et al. ................. 342/70

FOREIGN PATENT DOCUMENTS

JP  A 5-256638  10/1993

* cited by examiner

Primary Examiner—John Barlow
Assistant Examiner—Tung S. Lau
(74) Attorney, Agent, or Firm—Oliff & Berridge, PLC

(57) ABSTRACT

A high precision position detecting apparatus is provided in which a periodical position detecting error caused by an offset, dispersion of an amplitude difference, or a phase difference in an output signal of a position sensor is reduced. Digitized values DS and DC of the position sensor are subjected to averaging processing to output values ADS and ADC. A multiplier and an integrator calculate values ADS and ADC, using an output DST of a distance calculator, and obtain values SOS and COS which are substantially proportional to a value derived by integrating two output signals of the position sensor by a movement quantity. A divider divides the values SOS and COS by a value DSTS which is equivalent to a displacement and outputs values SO and CO which are equivalent to the average of two output signals of the position sensor. When a signal SET changes from low to high for each integer multiple period of two output signals of the position sensor, values SO and CO as offset components are stored in a memory.

2 Claims, 2 Drawing Sheets

HIGH PRECISION POSITION DETECTING APPARATUS CAPABLE OF REMOVING ERROR CONTAINED IN SIGNAL

BACKGROUND OF THE INVENTION

1. Field of the Invention

The present invention relates to a high precision position detecting apparatus capable of removing error caused by an offset in a signal from a position sensor outputting two signals which periodically vary in correspondence with measured displacement and differ 90° in phase, or by an amplitude difference or a phase difference between the two signals.

2. Description of the Related Art

Generally, when a movable unit or the like of a machine tool is moved, not only is positional control based on position information detected by a position detecting apparatus performed, but speed feedback control of an electric motor based on speed information derived from a difference in the position information is also performed. There has especially been a trend to increase a loop gain of the speed feedback in order to improve the response characteristics of a machine. The above-described conventional position detecting apparatus can remove an offset or an amplitude difference contained in output of a position sensor immediately after manufacture, but error caused by a change of an offset or an amplitude difference with the passage of a time after manufacture or by the installation environment of the position sensor cannot be removed. In other words, after the position detecting apparatus is manufactured, the offset or the amplitude difference generates a delicate change due to variations in the ambient temperature, changes in the components of the position sensor, leakage magnetic flux generated by an electric motor having the position detecting apparatus incorporated therein, and the like.

Furthermore, in the conventional position detecting apparatus, a generally used method of measuring the offset value or the amplitude correction value at the time of manufacture is to measure the maximum value and the minimum value of the output signal from the position sensor and derive the offset value and the amplitude value from the average thereof and the difference therebetween. Alternatively, as disclosed in Japanese Patent Laid-Open Publication No. Hei 5-256638, the offset value and the amplitude value can be derived from position sensor output signal values from a plurality of positions satisfying a specific condition. Because values of the position sensor output signal at a specific position are used in these methods, the methods are likely to be influenced by noise, waveform distortion, or the like, and there remains a problem that the offset and amplitude correction values cannot be precisely measured at the time of manufacture of the position detecting apparatus.

Ordinarily, influence exerted on the machining accuracy of a machine tool by a change of the offset, the amplitude difference, or the phase difference over time, or by measurement error at the time of shipment is, for practical purposes, negligibly small. However, because the position detecting error caused by such error becomes an error having a cycle equal to or twice that of the error of output signal of the position sensor, a frequency of speed ripple caused by the error and a machinery resonance frequency may, depending on the moving speed of the movable unit, coincide with each other and generate an irregular sound at the resonance position. In particular, because the irregular sound increases in proportion to the loop gain of the speed feedback and loop gain therefore cannot be increased, mechanical performance deteriorates. This problem is common also with optical type or magnetic type encoders in addition to a conventionally used resolver, whenever a position is derived by interpolation processing from two signals which periodically vary in correspondence with measured displacement and which differ 90° in phase.

SUMMARY OF THE INVENTION

The present invention was conceived to solve the above-described problems, and an object thereof is to provide a high precision position detecting apparatus capable of reducing periodic position detecting error caused by change in an offset, an amplitude difference or a phase difference over the passage of time or by installation environment, which is contained in an output signal of a position sensor having, as output, a plurality of signals which periodically vary in correspondence with measured displacement and respectively differ in phase, for improvement of the response characteristics of a movable unit of a machine tool or the like.

In the following, FIG. 2 is a block diagram showing an example of a position detecting apparatus. In FIG. 2, a position sensor 1 is a one-phase excitation two-phase output type resolver, which outputs a multiple of 100 times a rotational angle θ of the input shaft of the position sensor. Namely, when an input shaft is rotated, an excitation signal is amplitude modulated to a sine value and cosine value of a rotation quantity by the resolver, and signals AS and AC amplified by amplifiers 2 and 3 are output. In the example shown in FIG. 2, frequency of the excitation signal is 50 KHz, and, if the rotation angle of the input shaft of the position sensor 1 is set as θ and the amplitude of the output signal is set as G, the signals AS and AC can be expressed by the following formulas 1 and 2:

$$AS = G \cdot \mathrm{Sin}\,(100\theta)\,\mathrm{Sin}\,(2 \cdot \pi \cdot 50000 \cdot t) \quad \ldots (1)$$

$$AC = G \cdot \mathrm{Cos}\,(100\theta)\,\mathrm{Sin}\,(2 \cdot \pi \cdot 50000 \cdot t) \quad \ldots (2)$$

These signals AS and AC are sampled and digitized by a pulse signal TIM of a period of 20 μS output in synchronism with the excitation signal from a timing controller 13 at a timing of Sin (100000πt)=1 by respective AD converters 4 and 5, and converted into values DS and DC, respectively. Consequently, the values DS and DC can be expressed by formulas 3 and 4 below, respectively, and the output of the position sensor can be regarded as two signals which periodically vary in correspondence with the measured displacement θ and differ 90° in phase each other, the formulas being:

$$DS = G \cdot \mathrm{Sin}\,(100\theta) \quad \ldots (3)$$

$$DC = G \cdot \mathrm{Cos}\,(100\theta) \quad \ldots (4)$$

Because in actual practice the above-described digitized two values DS and DC contain an offset voltage and an amplitude difference due to product dispersion of the position sensor, or a signal amplifier, the above-described formulas 3 and 4 are more exactly expressed by the following formulas 5 and 6:

$$DS = B \cdot G \cdot \mathrm{Sin}\,(100\theta) + SOF \quad \ldots (5)$$

$$DC = G \cdot \mathrm{Cos}\,(100\theta) + COF \quad \ldots (6)$$

These offset values SOF, COF and an amplitude correction value BAJ (=1/B) representing the amplitude ratio between two signals contained in these values DS and DC are measured at the time of manufacture of the position detecting apparatus, stored in a nonvolatile memory or the like in the position detecting apparatus, and set in respective memories 6, 7, and 10 prior to performance of position detection. In subtraction devices 8 and 9, the offset values SOF and COF stored in the memories 6 and 7 are subtracted from the values DS and DC, respectively, to create values DSA and DCA. The value DSA is further multiplied by a multiplier 11 with the amplitude correction value BAJ stored in the memory 10 to become a value DSB of an amplitude which is approximately equal to that of the value DCA.

The values DSB and DCA are subjected to inverse tangent calculation with two variables as input by an interpolation calculator 12 and converted into a position signal POS representing a rotation quantity within $1/100^{th}$ of one rotation of the input shaft of the position sensor 1. Then, although not shown in the drawing, in an actual position detecting apparatus, position data of at least more than one rotation of the input shaft of the position sensor 1 is derived by incremental processing or the like based on the change of the position signal POS.

It should again be noted that, even after the manufacture of the position detecting apparatus, offset and amplitude differences are generated as a result of variation of ambient temperature, replacement of components comprising the position sensor, leakage magnetic flux generated by an electric motor having the position detecting apparatus incorporated therein, or the like. Removal of the offset or the amplitude error due to the passage of a time or the installation environment as such is not possible with the position detecting apparatus shown in FIG. 2.

Furthermore, in the example shown in FIG. 2, a minimal phase error for 90° phase difference between the two signals of the position sensor output signal, and this minimal phase error cannot be corrected with high precision at the time of manufacture of the position detecting apparatus.

According to the position detecting apparatus of the present invention, the periodical position detecting error generated by the change of the offset value, the amplitude difference, phase difference, or the like of the position sensor output signal with the passage of a time, which has conventionally been a problem, can be automatically and reliably reduced. Moreover, because the offset value, the amplitude correction value, or the phase correction value is automatically derived based on position sensor output signals at a plurality of positions, values less susceptible to influence of signal noise or waveform distortion can be precisely detected. Thereby high precision position detection is made possible, and the response characteristics of the movable unit of a machine tool or the like can thus be improved.

The present invention relates to a position detecting apparatus for converting an output from a position sensor which outputs two signals which periodically vary in correspondence with measured displacement and which differ 90° in phase, into position information, and the above-described object of the present invention is achieved by configuring an offset memory, an offset remover for removing an offset value stored in the offset memory from two output values of a position sensor, an interpolation calculator for converting the two output values from the offset remover into a position signal, a signal memory for storing the two output values of the position sensor, a distance calculator for calculating the displacement based on the two output values of the position sensor, a signal integrator for integrating the two output values of the position sensor and an output value of the distance calculator, an offset value calculator for calculating offset values based on the two output values of the signal integrator and the output value of the distance calculator, and an offset value setting device for setting the output values of the offset value calculator in the offset memory, after each period change of the position sensor output signal.

Furthermore, the above-described object of the present invention is also achieved by configuring an offset memory, an offset remover for removing an offset value stored by the offset memory from two output values of a position sensor, an interpolation calculator for converting the two output values of the offset remover into a position signal, a signal memory for storing the two output values of the position sensor, a distance calculator for calculating a square of a difference of the stored value of the signal memory with respect to each of the two output values and for calculating a square root of a value derived by adding the two values after the squaring calculations, a distance integrator for integrating the output value of the distance calculator, a signal multiplier for multiplying the two output values of the position sensor by the output value of the distance calculator, a signal integrator for integrating the two output values of the signal multiplier, an instructor for issuing a storage instruction and an integration instruction to the signal memory and the signal integrator, respectively, when the output value of the distance calculator exceeds a fixed value, a divider for dividing the two output values of the signal integrator by the output value of the distance integrator, and an offset value setting device for setting the two output values of the divider in the offset memory, after each period change of the position sensor output signal.

Furthermore, the above-described object of the present invention may also be achieved by configuring an amplitude correction value memory for storing an amplitude correction value, an amplitude corrector for correcting the signal amplitude of one output signal of a position sensor in accordance with the amplitude correction value stored in the amplitude correction value memory, an interpolation calculator for converting another output value of the position sensor and the output value of the amplitude corrector into a position signal, a signal memory for storing the two output values of the position sensor, a distance calculator for calculating a displacement(distance moved)based on the two output values of the position sensor, a positive number converter for converting the two output values of the position sensor into positive numbers, a converted positive number integrator for integrating the two output values of the positive number converter and the output value of the distance calculator, an amplitude correction value calculator for calculating an amplitude correction value based on the output value of the converted positive number integrator and the output value of the distance calculator, and an amplitude correction value setting device for setting the output value of the amplitude correction value calculator in the amplitude correction value memory, after each one half the period change of the position sensor output signal.

Furthermore, the above-described object of the present invention may still further be achieved by configuring an amplitude correction value memory for storing an amplitude correction value, an amplitude corrector for correcting the signal amplitude of one of the output signals of the position sensor in accordance with the amplitude correction value stored in the amplitude correction value memory, an interpolation calculator for converting another of the output values of the position sensor and the output value of the amplitude corrector into a position signal, a signal memory for storing the two output values of the position sensor, a distance calculator for calculating a square of a difference of the stored value of the signal memory with respect to each the two output values of the position sensor and for calculating a square root of a value derived by adding the two values after the squaring calculations, a distance integrator for integrating the output value of the distance calculator, a positive number converter for calculating a product of the output value of the distance calculator and each of the squared output values of the position sensor, a converted positive number integrator for integrating the two output values of the positive number converter, an instructor for issuing a storage instruction to the signal memory and an integration instruction to the converted positive number integrator when the output value of the distance calculator exceeds a fixed value, an amplitude correction value calculator for calculating an amplitude correction value from the output values of the distance integrator and the converted positive number integrator, and an amplitude correction value setting device for setting the output value of the amplitude correction value calculator in the amplitude correction value memory, after each one half the period change of the position sensor output signal.

Furthermore, the above-described object of the present invention may also be achieved by configuring a phase difference correction value memory for storing a phase difference correction value, a phase corrector for correcting one signal phase of one of the output signals of a position sensor in accordance with the phase difference correction value stored in the phase difference correction value memory and another of the output signals of the position sensor, an interpolation calculator for converting one of the output values of the position sensor and the output value of the phase corrector into a position signal, a signal memory for storing the two output values of the position sensor, a distance calculator for calculating a displacement based on the two output values of the position sensor, a correlation calculator for multiplying the two output values of the position sensor by the output value of the distance calculator, a correlation integrator for integrating the output value of the correlation calculator and the output value of the distance calculator, a phase difference correction value calculator for calculating the phase difference correction value based on the output value of the correlation integrator and the output value of the distance calculator, and a phase correction value setting device for setting the output value of the phase difference correction value calculator in the phase correction value memory, after each one half period change of the position sensor output signal.

Moreover, the above-described object of the present invention is achieved by configuring a phase difference correction value memory for storing a phase difference correction value, a phase corrector for correcting one signal phase of one of the output signals of a position sensor in accordance with the phase difference correction value stored by the phase difference correction value memory and another of the output signals of the position sensor, an interpolation calculator for converting one output value of the position sensor and the output value of the phase corrector into a position signal, a signal memory for storing two output values of the position sensor, a distance calculator for calculating a square of a difference of the stored value of the signal memory with respect to each of the two output values of the position sensor and for calculating a square root of a value derived by adding the two values after the squaring calculations, a distance integrator for integrating the output value of the distance calculator, a correlation calculator for multiplying a product of the two output values of the position sensor by the output value of the distance calculator, a correlation integrator for integrating the output value of the correlation calculator, an instructor for issuing a storage instruction to the signal memory and an integration instruction to the correlation integrator, when the output value of the distance calculator exceeds a fixed value, a phase difference correction value calculator for calculating the phase difference correction value from the output values of the distance calculator and the correlation integrator, and a phase correction value setting device for setting the output value of the phase difference correction value calculator in the phase correction value memory, after each one half period change of the position sensor output signal.

In the position detecting apparatus according to the present invention, the offset value, the amplitude correction value, and the phase correction value of the position sensor output signal are automatically derived utilizing signals output by the position sensor at a plurality of positions. The offset value, the amplitude correction value, and the phase correction value, are therefore less susceptible to the influence of a signal noise or waveform distortion and can be precisely detected. By correcting the position sensor output signal with these values, high precision position detection is possible.

DETAILED DESCRIPTION OF THE INVENTION

The present invention is based on a concept that a rotational displacement of a position sensor is divided into each of micro rotational displacements (increments), for observation based on each period change or each one half period change of a position sensor output signal, whereby a change of an offset or an amplitude correction value with the passage of time after manufacture can be determined and used for calculation. For example, when an output signal, which is a function of a sine wave, is sequentially integrated by the micro rotational displacement for a integral region of one period of this signal, the integrated value must be zero if there is no offset. On the contrary, if the integrated value is not zero, this integrated value corresponds to an offset value. Similarly, when a square of an output signal is sequentially integrated by the micro rotational displacement for an integral region of one half the period of this signal, and the previously derived offset value is subtracted, then the value obtained is an effective value. From a ratio of the effective values of two output signals, an amplitude correction value or the like is obtained.

Figure 1:
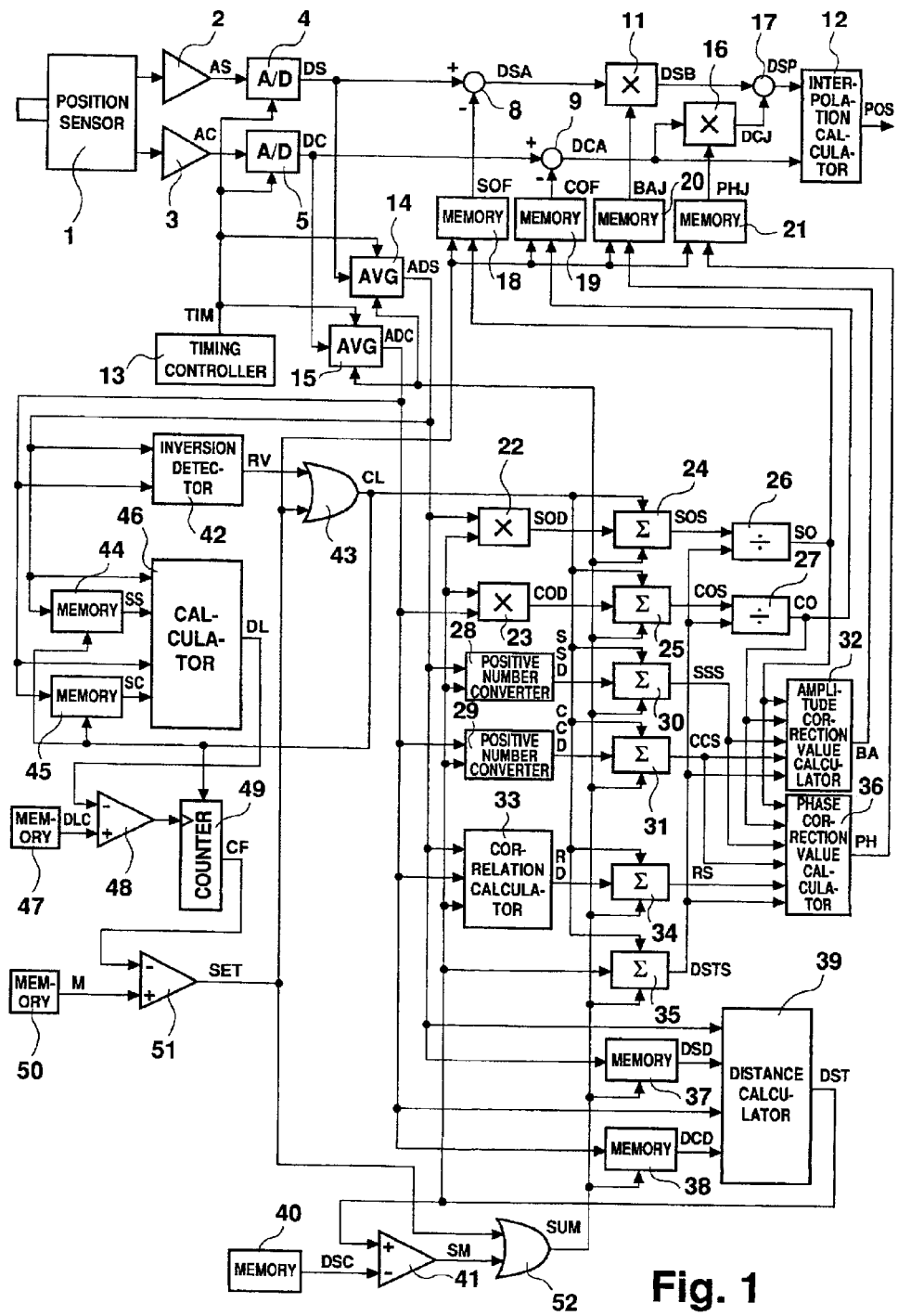
FIG. 1 is a block diagram showing an embodiment of a position detecting apparatus according to the present invention.
Figure 2:
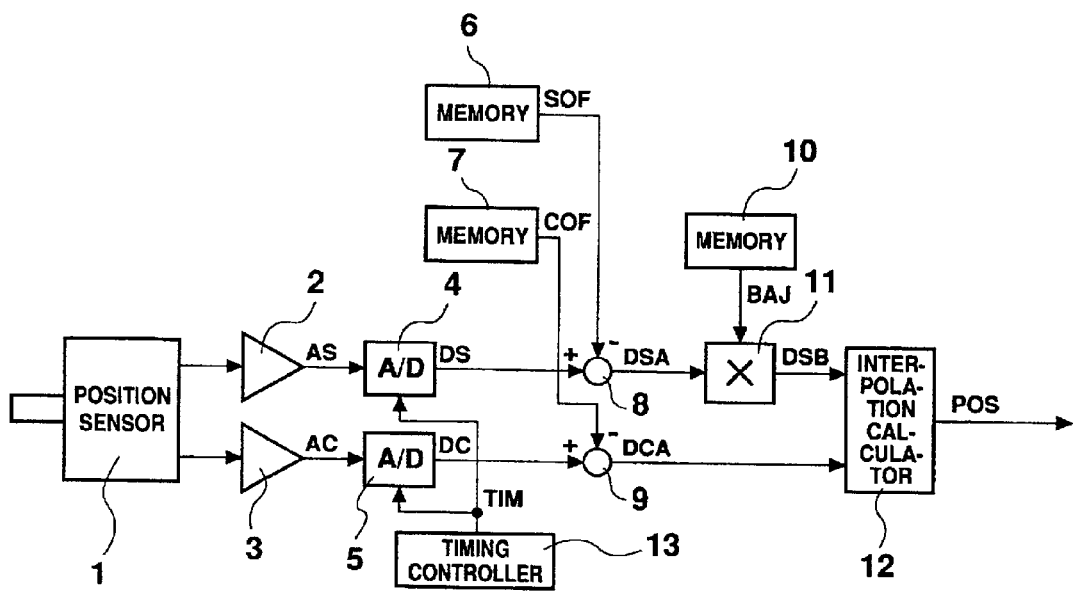
FIG. 2 is a block diagram showing a conventional position detecting apparatus.

Hereinafter, a preferred embodiment of the present invention is described with reference to the drawings. FIG. 1 is a block diagram showing an embodiment of a position detecting apparatus according to the present invention corresponding to the conventional position detecting apparatus shown in FIG. 2. Components of the position detecting apparatus shown in FIG. 1 which have the same function as those shown in FIG. 2 are labeled with the same numerals and their descriptions are not repeated.

First, in the position detecting apparatus shown in FIG. 1, values DS and DC derived by digitizing output signals from a position sensor 1 are subjected to the averaging processing shown by calculations of the following formulas 7 and 8 by averaging processors 14 and 15:

$$ADS(n)=(DS-ADS(n-1))/N+ADS(n-1) \qquad \ldots (7)$$

$$ADC(n)=(DC-ADC(n-1))/N+ADC(n-1) \qquad \ldots (8)$$

Symbols n and N in the formulas 7 and 8 are numbers which are initialized at 0 when a signal SUM increases from low to high, and incrementally increase corresponding to each change of a signal TIM from low to high. Furthermore, when n is larger than 256, N is fixed at N=256. It should be noted that ADS (n) and ADC (n) show the values of ADS and ADC at n, and that ADS(0)=ADC(0)=O.

Then, the output values ADS and ADC from the position sensor 1 which are averaged by the averaging processors 14 and 15 are stored in memories 37 and 38 respectively when the signal SUM changes from low to high, and the stored values DSD and DCD in the memories 37 and 38 and values ADS and ADC are input into the following formula 9, wherein SQRT indicates a square root operation and 2 refers to squaring, and a value DST is output by a distance calculator 39:

$$DST=SQRT((ADS-DSD)^\wedge 2+(ADC-DCD)^\wedge 2) \qquad \ldots (9)$$

Here, the value DST is substantially proportional to a distance (a movement quantity) of measured displacement after the signal SUM inputs. The value DST is compared with the value DSC stored by a memory 40 in a comparator 41, and when the value DST exceeds the value DSC, an output signal SM of the comparator 41 changes from low to high. Here, the value DSC is preset corresponding to a value DST that is calculated when an input shaft of the position sensor 1 moves a sufficiently smaller rotational distance than one rotation, which means smaller than $1/100^{th}$ rotation of the resolver. When the signal SM changes from low to high, the signal SM becomes a signal SUM through an "OR" circuit 52, and the signal SUM issues a storage instruction and an integration instruction to the memories 37 and 38 and all integrators, respectively.

In this manner, the signal SUM changes from low to high for each micro rotational displacement DSC, and thus calculation for each of the following micro rotational displacements can be proceeded with the signal SUM as reference.

Furthermore, the value DST is integrated by an integrator 35 when the signal SUM changes from low to high, and the integrator 35 is initialized when a signal CL changes from high to low. Accordingly, the value DST output by the integrator 35 becomes a value substantially proportional to a displacement which is a rotated distance of an input shaft of the position sensor 1 from the time when the signal CL changes from high to low.

Next calculation of an offset value, which is the core of the first embodiment of the present invention, will be described. In the multipliers 22 and 23, the values ADS and ADC are separately multiplied with the value DST and the results are output as respective values SOD and COD. The values SOD and COD are integrated by respective integrators 24 and 25 when the signal SUM changes from low to high, and output as values SOS and SOS. Furthermore, the integrators 24 and 25 are initialized at 0 when the signal CL changes from high to low. Accordingly, the values SOS and COS output by the integrators 24 and 25 are substantially proportional to a value integrated each of the two output signals of the position sensor 1 by a movement quantity from the time when the signal CL changes from high to low. Then, in dividers 26 and 27, the values SOS and COS are divided by the value DSTS, and output as values SO and CO. Accordingly, the values SO and CO, divided the values SOS and COS by the value DSTS which is substantially proportional to the movement quantity, become the average values of the two output values DS and DC of the position sensor 1 from the time when the signal CL changes from high to low.

In order to derive the offset value, it is necessary to observe the output signal of the position sensor 1 over an integer multiple of one period thereof. A signal equivalent to an integer multiple of one period is derived in the following manner. First, memories 44 and 45 store the values ADS and ADC, respectively, when the signal CL changes from low to high, and then a value DL is calculated from the stored values SS and SC and the values ADS and ADC by a calculator 46 using the formula 10, wherein:

$$DL=(ADS-SS)^\wedge 2+(ADC-SC)^\wedge 2) \qquad \ldots (10)$$

A comparator 48 compares the value DL with the value DLC stored in a memory 47, and "1" is output from the comparator 48 when the value DL is smaller than the value DLC. In such a case, the value DLC is a value sufficiently smaller than a square of the value DSC. Accordingly, the output of the comparator 48 then changes from low to high at each time the values ADS and ADC periodically change to become substantially the same as the values SS and SC.

Consequently, when the input shaft of the position sensor 1 is rotated in a fixed direction, the output of the comparator 48 changes from low to high at each period portion of the signals AS and AC. The change of the comparator 48 from low to high is counted by a counter 49, and a count value CF is output. Furthermore, the counter 49 is initialized at 0 when the signal CL changes from low to high. The count value CF is compared with an integer M stored by a memory 50 at a comparator 51, and a signal SET changes from low to high when the count value CF exceeds the value M. Accordingly, the signal SET changes from low to high when the output signal of the position sensor 1 advances an integer M times period after the signal CL changes from low to high. Furthermore, when the signal SET changes from low to high, it becomes a signal SUM, which issues a storage instruction and an integration instruction to the memories 37 and 38 and all the integrators through the "OR" circuit 52, respectively.

In this manner, because the signal SET changes from low to high for each integer M times the period change of output signal of the position sensor using the signal CL change from low to high as reference, calculation can be performed over the period of the output signal.

An inversion detector 42 detects a change of the rotational direction of the input shaft of the position sensor 1 from changes of the values ADS and ADC, and causes a signal RV to change to "1" by a short pulse. An "OR" circuit 43 outputs the signal CL as a logical sum of the signal RV and the signal SET, and, when the output signal of the position sensor advances an integer M times period, or when the rotational direction of the input shaft is changed, the signal CL is caused to change to "1" by a short pulse.

The values SO and CO are stored in respective memories 18 and 19 when the signal SET changes from low to high. Because the signal SET changes from low to high when the output signal of the position sensor 1 advances an integer multiple period after the signal CL changes from low to high, the output values SOF and COF of the memories 18 and 19 become average values of the two output values DS and DC of the position sensor 1 during an integer multiple period thereof. Consequently, because signal variation portions are cancelled out, the values SOF and COF become equivalent to offset components of the output values DS and DC. In this manner, the offset value is derived.

From the values DS and DC, the values SOF and COF are subtracted by respective subtraction devices 8 and 9, in the same manner as the related art, to derive values DSA and DCA from which the offset has been removed.

Next, calculation of an amplitude correction value, which is the core of a second preferred embodiment of the present invention, will be described. Positive number converters 28 and 29 convert the calculated values into positive numbers irrespective of whether the values ADS and ADC are positive or negative, by multiplying each value derived by squaring the values ADS and ADC by the value DST, and output values SSD and CCD. The values SSD and CCD are integrated by integrators 30 and 31 respectively when the signal SUM changes from low to high, and output as values SSS and CCS. Furthermore, the integrators 30 and 31 are initialized at 0 when the signal CL changes from high to low. Accordingly, the values SSS and CCS are substantially proportional to values derived by integrating squared values of the two output signals of the position sensor 1 by a movement quantity. An amplitude correction value calculator 32 calculates the following formula 11, wherein "*" denotes multiplication, and outputs a value BA:

$$BA=SQRT((CCS-CO{\wedge}2*DSTS)/(SSS-SO){\wedge}2*DSTS)) \quad \ldots (11)$$

A memory 20 stores the value BA when the signal SET changes from low to high. From the above description, an output value BAJ of the memory 20 is a ratio derived by use of the formula 11, wherein the squares of two output values DS and DC of the position sensor 1 are integrated by the movement quantity for the integral region of an integer multiple period thereof, and from the resulting values are subtracted the offset components, the square roots thereof are extracted, and the ratio between the two square roots is derived. Accordingly, the value BAJ represents a ratio of the effective values of the output values DS and DC, the ratio being equivalent to the amplitude ratio of the output values DS and DC. In this manner, the amplitude correction value is derived.

A multiplier 11 multiplies the value DSA after removal of the offset by the value BAJ, in the same manner as the related art. The resulting value DSB of the amplitude is substantially equivalent to the amplitude of the value DCA.

It should be noted that when a value after removal of the offset or an offset negligible sensor output value are input as the values ADS and ADC into positive number converters 28 and 29 respectively, input of the value SO, CO, or DSTS becomes unnecessary. Furthermore, because the amplitude correction value indicates a value slightly different from the value obtained by the formula 11 when the amplitude difference becomes larger, a modification quantity is precalculated and a modified calculation may be added. Alternatively, by repetitive correction calculations repeating a calculation for more precise amplitude correction value using the formerly corrected amplitude as input, precision of the amplitude correction value may be improved.

Next, a calculation of a phase correction value, which is the core of a third embodiment of the present invention, will be described. A correlation calculator 33 multiplies the product of the value ADS and the value ADC by the value DST, and outputs a value RD. The value RD is integrated by an integrator 34 when the signal SUM changes from low to high, and outputs as a value RS. Furthermore, the integrator 34 is initialized at 0 when the signal CL changes from high to low. Accordingly, the value RS becomes a value substantially proportional to a value derived by integrating the product of the two output signals of the position sensor 1 by a movement quantity over the time when the signal CL changes from high to low. A phase correction value calculator 36 calculates formulas 12, 13, and 14 below and outputs a value PH.

$$X=(RS/DSTS-SO*CO) \quad \ldots (12)$$

$$Y=SQRT((SSS/DSTS-SO{\wedge}2)(CCS/DSTS-CO{\wedge}2)) \quad \ldots (13)$$

$$PH=X/Y \quad \ldots (14)$$

A memory 21 stores the value PH when the signal SET changes from low to high. From the formula 12, a value X is obtained by subtracting the offset component from the average value of the product of the two output values DS and DC of the position sensor 1. Accordingly, the value X represents a magnitude of the same phase component as the output values DS and DC. The formula 13 calculates the product of the effective values of the output values DS and DC. Accordingly, a numeral value Y is equivalent to one half of the amplitude product of the output values DS and DC. The formula 14 calculates a value derived by dividing the magnitude of the same phase component of the output values DS and DC by the amplitude product of the output values DS and DC to derive the value PH. Accordingly, an output PHJ of the memory 21 is a phase correction value representing a proportional ratio between the phase component of one of the two output values DS and DC, and another of the output values DS and DC. Thus, the phase correction value is derived.

A multiplier 16 multiplies the value DCA after removal of the offset by the value PHJ, and a subtractor 17 subtracts the output value DCJ of the multiplier 16 from the value DSB after correction of the amplitude, and thus a component of the same phase as the value DCA contained in the value DSB can be removed. By this processing, the phase difference between an output value DSP of the subtractor 17 and the value DCA becomes exactly 90°. The value DSP and the value DCA are subjected to inverse tangent calculation in an interpolation calculator 12 using two variables to output a position signal POS representing a rotation quantity in $1/100^{th}$ of a rotation of the input shaft of the position sensor 1.

It should be noted that the amplitude of the value DSP after phase correction is slightly different from the amplitude of the value DCA and, thus, when the phase correction value is larger, the value modification should be performed such that the amplitude correction value BAJ and the amplitude corrected by phase correction value PHJ becomes to equal. Furthermore, when a value after removal of the offset or a negligible offset of the sensor output value are input as ADS and ADC into the correlation calculator 33, the values SO and CO become unnecessary. Also, when the amplitude of the output values DS and DC are stable, input of the values SSS and CCS to the correlation calculator 33 becomes unnecessary and, in this case, the value X must be previously derived from the amplitude of the values DS and DC.

In the above-described embodiment, although the value ADS and the value ADC are used as the inputs to the multipliers 22 and 23, positive number converters 28 and 29, or correlation calculator 33, if the average value of the value ADS and the value DSD is used instead of the value ADS, and the average value of the value ADC and the value DCD is used instead of the value ADC, precision of integration calculation is improved, and more precise offset, amplitude correction, and phase correction values can be derived. Furthermore, when noise in the values DS and DC is small, the averaging processor may be omitted.

Moreover, in the position detecting apparatus according to the present invention, means for obtaining the offset value, amplitude correction value, and phase correction value need not be included in the shipped apparatus because at the time of manufacture stand alone inspection equipment or the like, having means for obtaining those values, measures values precisely for an apparatus to be shipped and stores those values to be used after shipment into a nonvolatile memory or the like in the apparatus.

Moreover, during the calculation of the amplitude correction value and phase correction value, the values are output when the signal SET changes from low to high for each integer multiple period, and also output for each integer multiple of half a period is possible, although setting an integer multiple period is may be preferable to conform with the calculation of the offset value. Furthermore, a distance integrator 39 may derive a displacement by use of rotational displacement of the position sensor.

What is claimed is:

1. A position detecting apparatus for converting an output signal from a position sensor which outputs two signals which periodically vary in correspondence with measured displacement and which differ 90° in phase, into position information, comprising:

an offset memory, an offset remover for removing an offset value stored by the offset memory from two output values of the position sensor, respectively, and an interpolation calculator for converting two output values of the offset remover into a position signal, a signal memory for storing the two output values of the position sensor, a distance calculator for calculating a square of a difference of the stored value of the signal memory with respect to each of the two output values, and for calculating a square root of a value derived by adding the two values after the squaring calculations, and a distance integrator for integrating the output value of the distance calculator;

a signal multiplier for multiplying the two output values of the position sensor by the output value of the distance calculator, and a signal integrator for integrating the two output values of the signal multiplier;

an instructor for issuing a storage instruction and an integration instruction to the signal memory and the signal integrator, respectively, when the output value of the distance calculator exceeds a fixed value;

a divider for dividing two output values of the signal integrator with the output value of the distance integrator, and an offset value setting device for setting the two output values of the divider in the offset memory, after each period change of the position sensor output signal.

2. A position detecting apparatus according to claim 1, wherein an output from a position sensor is the average value of an actual output signal of the position sensor up to a point when the instructor issues a storage instruction.

* * * * *